US010464348B2

(12) United States Patent
Barnes

(10) Patent No.: US 10,464,348 B2
(45) Date of Patent: Nov. 5, 2019

(54) BEND SENSOR

(71) Applicant: Hewlett-Packard Development Company, L.P., Houston, TX (US)

(72) Inventor: Arthur H. Barnes, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/523,356

(22) PCT Filed: Dec. 11, 2014

(86) PCT No.: PCT/US2014/069667
§ 371 (c)(1),
(2) Date: Apr. 28, 2017

(87) PCT Pub. No.: WO2016/093830
PCT Pub. Date: Jun. 16, 2016

(65) Prior Publication Data
US 2017/0239963 A1 Aug. 24, 2017

(51) Int. Cl.
*B65H 1/04* (2006.01)
*G01B 7/02* (2006.01)
(Continued)

(52) U.S. Cl.
CPC .......... *B41J 13/0009* (2013.01); *B41J 13/10* (2013.01); *B65H 1/04* (2013.01); *B65H 31/02* (2013.01); *B65H 31/22* (2013.01); *B65H 43/06* (2013.01); *G01B 7/02* (2013.01); *H01C 3/06* (2013.01); *H01C 10/106* (2013.01); *B65H 2301/4212* (2013.01); *B65H 2511/11* (2013.01); *B65H 2511/12* (2013.01); *B65H 2511/152* (2013.01);
(Continued)

(58) Field of Classification Search
CPC ....... B41J 13/0009; B41J 13/10; G01D 5/165; H01C 10/106; H01C 3/06; G01B 7/18; G01B 7/02; B65H 2511/51; B65H 2301/4212; B65H 2511/20; B65H 2513/53; B65H 2511/528; B65H 2511/30; B65H 2511/11; B65H 2511/12; B65H 2511/152; B65H 2553/21; B65H 43/06; B65H 31/22; B65H 31/02; B65H 1/04
See application file for complete search history.

(56) References Cited

U.S. PATENT DOCUMENTS 5,609,333 A 3/1997 Mandel et al.
5,934,140 A 8/1999 Jackson et al.
(Continued)

FOREIGN PATENT DOCUMENTS

CN 101105678 1/2008
CN 1751979 1/2009
(Continued)

OTHER PUBLICATIONS

Flexpoint Sensor Systems brochure.*
(Continued)

*Primary Examiner* — Huan H Tran
(74) *Attorney, Agent, or Firm* — HP Inc. Patent Department

(57) ABSTRACT

In one example a bend sensor is disclosed. The bend sensor extends into a media tray. The bend sensor has a tip where a deflection amount of the tip indicates a media parameter.

15 Claims, 4 Drawing Sheets

(51) Int. Cl.
*G01B 7/16* (2006.01)
*H01C 3/06* (2006.01)
*B41J 13/00* (2006.01)
*B41J 13/10* (2006.01)
*B65H 31/02* (2006.01)
*B65H 31/22* (2006.01)
*B65H 43/06* (2006.01)
*G01D 5/165* (2006.01)
*H01C 10/10* (2006.01)

(52) U.S. Cl.
CPC ...... *B65H 2511/17* (2013.01); *B65H 2511/20* (2013.01); *B65H 2511/30* (2013.01); *B65H 2511/51* (2013.01); *B65H 2511/528* (2013.01); *B65H 2513/53* (2013.01); *B65H 2515/708* (2013.01); *B65H 2553/21* (2013.01); *B65H 2553/212* (2013.01); *G01B 7/18* (2013.01)

(56) References Cited

U.S. PATENT DOCUMENTS

| | | |
|---|---|---|
| 6,206,594 B1 | 3/2001 | Elgee et al. |
| 6,914,684 B1 | 7/2005 | Bolash et al. |
| 7,374,163 B2 | 5/2008 | Cook et al. |
| 7,758,044 B2 * | 7/2010 | Nonaka ............... B65H 5/062 271/272 |
| 7,814,801 B2 * | 10/2010 | Inamori ............... G01B 7/18 73/849 |
| 8,840,214 B2 | 9/2014 | De Jong et al. |
| 2008/0308998 A1 | 12/2008 | Dobashi et al. |
| 2009/0257808 A1 | 10/2009 | Krucinski |
| 2010/0166484 A1 | 7/2010 | Edwards et al. |
| 2011/0133390 A1 | 6/2011 | Ohfuchi |
| 2012/0075657 A1 | 3/2012 | Yamamoto |
| 2012/0248694 A1 | 10/2012 | Cheng |
| 2013/0257956 A1 | 10/2013 | De Jong et al. |
| 2013/0257957 A1 * | 10/2013 | Itogawa ............ B41J 11/0005 347/16 |

FOREIGN PATENT DOCUMENTS

| | | |
|---|---|---|
| CN | 100455499 | 1/2009 |
| CN | 101424509 | 5/2009 |
| JP | 2000281258 | 10/2000 |
| JP | 2009007108 | 1/2009 |
| JP | 2010120342 | 6/2010 |

OTHER PUBLICATIONS

Short flex sensor at : https://www.adafruit.com/product/1070.*
Long flex sensor at : https://www.adafruit.com/product/182.*
SpectraSymbol, "Flex Sensor", published on Feb. 12, 2010.*
Sensor Products Inc, "Tactilus Flex Sensor", Sensor Products Inc. 2010. (Year: 2010).*

* cited by examiner

BEND SENSOR

BACKGROUND

Printers typically have at least one input tray and at least one output tray. The printer keeps track of the amount of media and the media size in the input and output trays using sensors.

DETAILED DESCRIPTION

Figure 1:
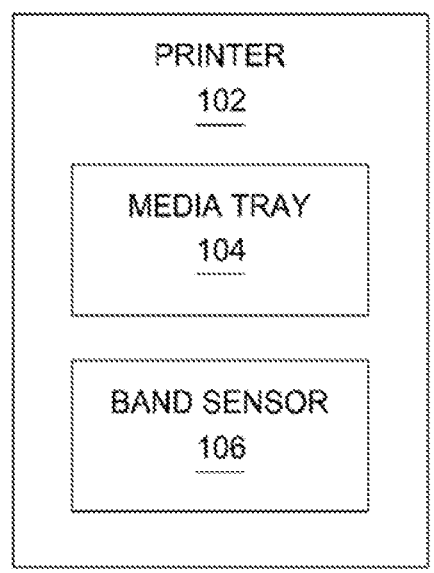
FIG. 1 is a block diagram of an example printer.

Printers may use at least one sensor to detect the amount of media in an input or output tray. The sensors may be optical sensors that detect the amount of light reflected from the surface of the media. As the height of the media stack gets lower, the amount (or intensity) of light reflected becomes smaller. Therefore the printer can determine how much media is loaded in the media tray by reading the amount of light reflected from the surface of the media. Unfortunately the accuracy of this type of sensor can be affected by the gloss level, brightness and/or the color of the media.

Some printers use mechanical arms that rest on the top sheet of media in the stack. An encoder (or potentiometer) measures the position of the arm to determine the amount of media in the stack. These types of sensors have a number of moving parts and the accuracy may vary due to the mechanical tolerances of the parts. They may also be costly to produce.

The printer may also have sensors that detect the length and width of the media in the tray. These sensors are typically coupled to the media guides in the tray. There may be a number of optical interrupt sensors to detect multiple widths or an analog encoder that can detect multiple positions of the guides.

In one example, bend sensors will be used to detect the media properties of media in a media tray. A bend sensor is any sensor whose electrical resistance increases as the sensor is deflected or bent. One example bend sensor is a thin film, single layer, flexible sensor whose electrical resistance increases as the sensor is deflected. Bend sensors may also be known as flex sensors. An example bend sensor is the Flexpoint bend sensor 3000-000. The Flexpoint bend sensor 3000-000 is 7.1 mm wide, 76.2 mm long and 0.2 mm thick (see www.flexpoint.com).

At least one bend sensors may be used to detect different media properties of the media in a media tray. The different media properties may include the number of sheets in a stack of media, the width of the media and the length of the media. One bend sensor may detect the amount of media in the media tray by detecting the height of the stack of media in the media tray. Another bend sensor may be used to determine the width or length of the media in the media tray.

When detecting the amount of media in the media tray, a bend sensor will be positioned such that one end of the bend sensor extends into the media tray of the printer. The end of the bend sensor will be deflected/bent by different amounts depending on the amount of media in the media tray. The bend sensor will have different resistance at the different deflected/bent positions. The printer can determine how many sheets of media are in the stack by measuring the resistance of the bend sensor. The printer may have a calibration table correlating the amount of electrical resistance with the number of sheets of media in the media tray.

When detecting the width or length of media in the media tray, a bend sensor may be coupled to the media guides (or directly on the media) in the media tray. As the media guides are moved to accommodate different media widths/lengths, the bend sensor will be deflected by different amounts. The printer may have a calibration table correlating the amount of electrical resistance with the width or length of the media in the media tray.

FIG. 1 is a block diagram of an example printer. The printer 102 comprises a media tray 104 and a bend sensor 106. The media tray 104 may also be known as a media bin. The media tray 104 may be an input media tray that holds blank media or an output media tray that holds media after it has been printed on. Some example input media trays are removable and media is loaded into the tray once it has been removed from the printer. The loaded media tray is then re-inserted into the printer. Other example input media trays are fixed in place in the printer and the media is loaded directly into the media tray. In this example only one media tray 104 is shown. In other examples there may be multiple input media trays and/or multiple output media trays.

The bend sensor 106 may be used to detect different media properties of media in the media tray. The different media properties may include the number of sheets of media in the media tray, the width of the media and/or the length of the media in the media tray.

When detecting the amount of media in the media tray 104, the bend sensor 106 will be positioned such that the tip of the bend sensor 106 extends into the media tray 104. The tip of the bend sensor 106 will be deflected/bent by different amounts depending on the amount of media in the media tray 104. The bend sensor 106 will have a different resistance at the different deflect/bent positions. The printer 102 can determine how many sheets of media are in the stack by measuring the resistance of the bend sensor 106.

Figure 2A:
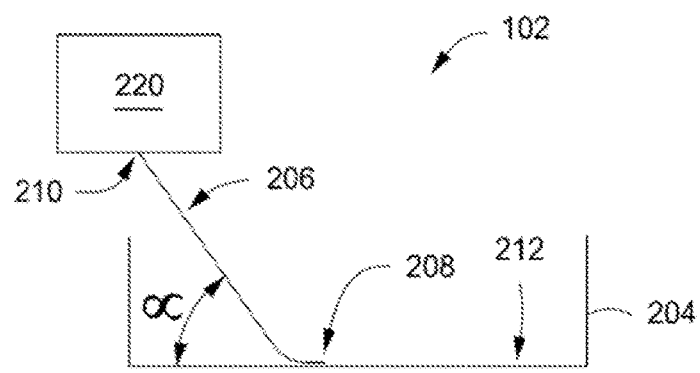
FIG. 2A is a schematic side view of the example printer from FIG. 1.

FIG. 2A is a schematic side view of the example printer from FIG. 1. Printer 102 comprises a printer body 220, a bend sensor 206 and a media tray 204. In this example the media tray 204 has a bottom surface 212 that forms a plane to support a stack of media. The media tray 204 also has a front wall, a back wall and two side walls (the two side walls are not shown for clarity). The bend sensor 206 has a base 210 and a tip 208. The base 210 is attached to the printer body 220 and the bend sensor 206 extends into the media tray 204 at an angle α with respect to the bottom surface 212 of the media tray 208. In some examples angle α is between 0 and 90 degrees, for example, 45 degrees.

In this example, the tip 208 of the bend sensor 206 contacts the bottom surface 212 of the media tray 204 when the media tray 204 is empty (as shown). Because the tip 208 of the bend sensor 206 contacts the bottom surface 212 of the media tray 204, the bend sensor 206 will be slightly bent/deflected even when the media tray 204 is empty. Even when only one sheet of media is loaded into the media tray 204, the tip 208 of the bend sensor 206 will be deflected more than when the media tray 204 is empty. This allows for the detection of a single sheet of media loaded in the media tray 204.

Figure 2B:
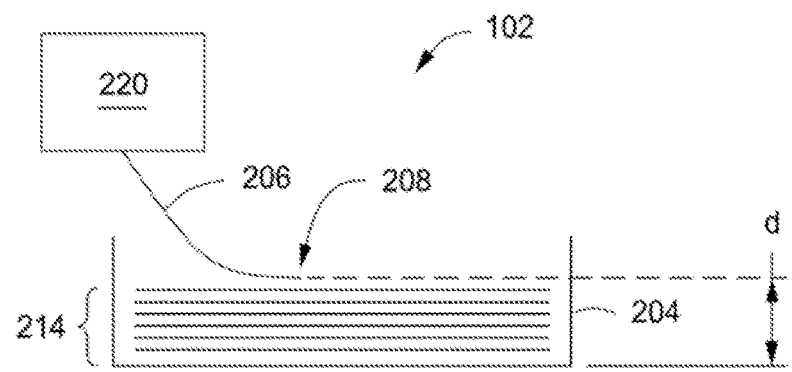
FIG. 2B is a schematic side view of the example printer from FIG. 2A with media 214 in the media tray.

FIG. 2B is a schematic side view of the example printer from FIG. 2A with media 214 in the media tray. The tip 208 of the bend sensor 206 has been displaced upward by distance d. In some examples an input media tray may hold up to 500 sheets of media. Depending on the weight of the media, 500 sheets may be between 45 to 60 mm thick, for example 50 mm thick. Other input media trays may hold up to 1,000 sheets of media. Therefore the defection of the tip 208 of the bend sensor from when the input media tray 204 is full to when it is empty (i.e. distance d) be between 45 mm to 120 mm. Output media trays typically hold fewer sheets than input media trays, for example 350 sheets. Therefore the defection of the tip 208 of the bend sensor from when an output media tray 204 is full to when it is empty (i.e. distance d) may be between 0 mm to 40 mm.

Figure 3:
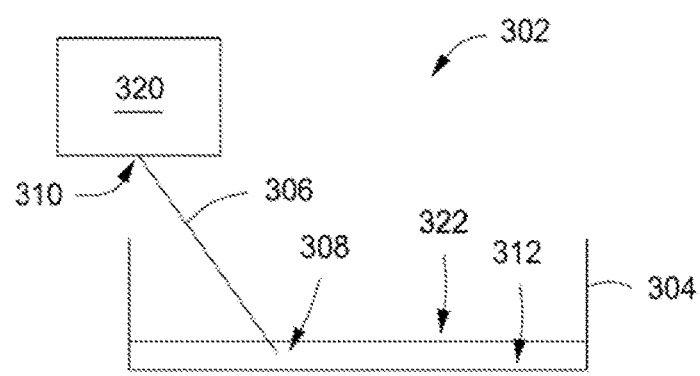
FIG. 3 is a schematic side view of another example printer.

FIG. 3 is a schematic side view of another example printer. Printer 302 includes a printer body 320, a bend sensor 306 and a media tray 304. The media tray 304 has a front wall, a back wall and two side walls (the two side walls are not shown for clarity). In this example the media tray 304 has a bottom surface 312 and a number of parallel ribs 322 (only one is shown). The parallel ribs extend along the length of the media tray 304 and the top surface of the ribs form a plane that is above the bottom surface of the media tray 304 such that the ribs support media in the media tray 304.

The bend sensor 306 has a base 310 and a tip 308. The base is attached to the printer base 320. When the media tray is empty (as shown), the tip 308 of the bend sensor 306 extends below the plane defined by the top surface of the ribs 322 but does not contact the bottom surface 312 of the media tray 304. Therefore the bend sensor 306 is un-deflected or not bent when the media tray 304 is empty. When media is positioned into the media tray 304 the tip 308 of the bend sensor 306 will be defected/bent to a position above the level of the plane defined by the ribs 322 top surface. In other examples the media tray 304 may not have ribs but the bottom surface of the media tray 304 may have a recess or depression where the tip of the bend sensor 306 can extend into such that the tip of the bend sensor 306 is not deflected when the media tray 304 is empty.

Figure 4:
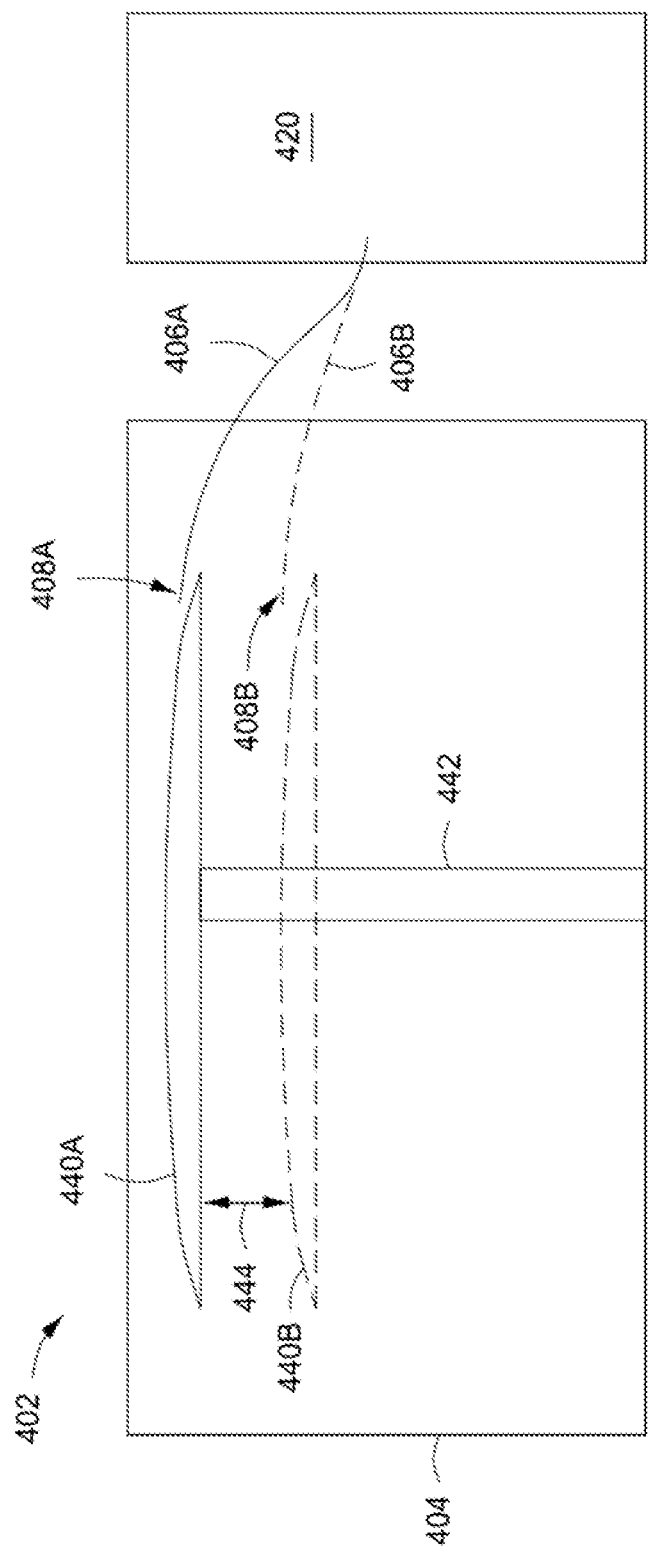
FIG. 4 is a top view of an example printer.

FIG. 4 is a top view of an example printer. Printer 402 includes a printer body 420, a bend sensor 406 and a media tray 404. In this example the media tray 404 has a media guide movable along channel 442 between a number of different positions in the direction shown by arrow 444. The media guide is shown in two different positions (440A and 440B). In the first position 440A a media of a first width will fit in the media tray 404 and in the second position 440B media of a different, smaller, width will fit in the media tray 404.

A bend sensor 406 is attached to the printer body 420 and the tip 408 extends into the media tray 404 and contacts the media guide. As the media guide is moved to different positions in the direction shown by arrow 444, the tip 408 of the bend sensor 406 is defected to a greater or lesser amount. The printer 402 can determine the location of the media guide and, therefore, the width of the media by measuring the resistance of the bend sensor 406. In other examples, the bend sensor base may be attached to the media tray 404 instead of the printer body 420.

In this example, the media tray 404 has a single media guide. In other examples, there may be two media guides that move in opposite directions to keep the media centered in the media tray 404. In this example, the tip of the bend sensor 406 moves in a one-to-one relationship with the media guide. In other examples, the tip of the bend sensor 406 may be coupled to the media guide through a reduction linkage such that a given movement of the media guide will produce a proportional but smaller movement of the tip of the bend sensor 406.

Figure 5:
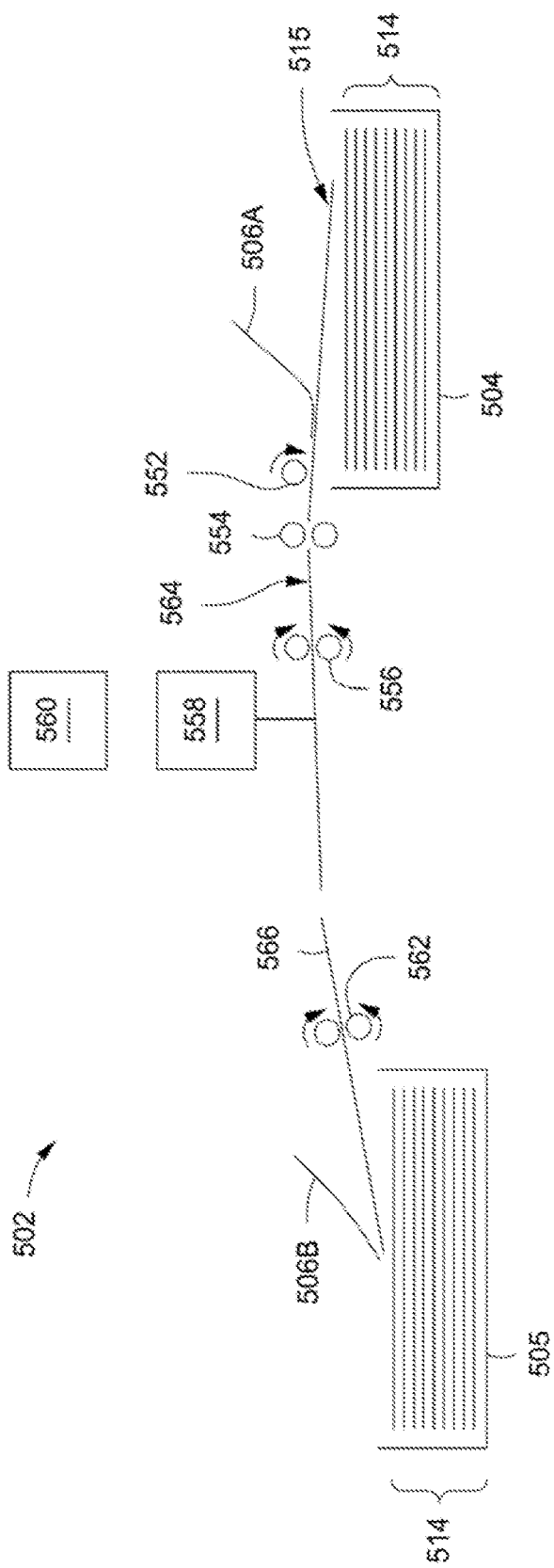
FIG. 5 is a block diagram of an example printer.

FIG. 5 is a block diagram of an example printer. Printer 502 includes an input media tray 504, a first bend sensor 506A, a pick wheel 552, a pair of pinch rollers 554, a pair of feed rollers 556, a print engine 558, a controller 560, a pair of output rollers 562, an output media tray 505 and a second bend sensor 506B. A paper path in defined as the path media takes as it travels through the printer from the input tray to the output tray. In this example, the paper path starts at the input media tray 504 where the pick wheel feeds the top sheet of media 515, from the stack of media 514, into the pair of pinch rollers 554. The paper path continues between the pair of feed rollers 556, underneath the print engine 558, between the pair of output rollers 562 and into the output media tray 505. The paper path shown is a simplex paper path, but other paper paths may also be present, for example a duplex paper path.

As the media passes underneath the print engine, printing fluid is deposited onto the media from the print engine 558. In this example, the print engine 558 is depicted as an inkjet print engine, but any type of print engine could be used, for example a LaserJet engine or the like. In this example, the printer 502 uses sheets of media as the blank media. In other examples, the printer 502 may use a continuous roll or web of media as the blank media. The web of media may be cut into sheets after the print engine 558 has deposited printing fluid onto the surface of the media. The cut sheets of media are then stacked into an output media tray. In this example, a single input media tray and one output is shown. In other examples, there may be multiple input media trays and/or multiple output media trays.

The first bend sensor 506A extends into the input media tray 504. The tip of the first bend sensor is deflected by different amounts depending on the amount of media 514 loaded into the input media tray 504. The controller 560 is coupled to the first bend sensor and can determine the resistance of the bend sensor. The controller may contain memory that has a calibration table that correlates the resistance of the bend sensor to the number of media sheets in the stack of media 514. The controller can determine the amount of media in the stack using the resistance of the bend sensor and the calibration table.

In one example, there may be only one calibration table for media of a default weight. In other examples there may be multiple calibration tables for media of different weights. In yet another example there may be only one calibration table that has a formula to adjust the number of sheets in the stack of media dependent on the weight of media in the stack.

The controller may also use the bend sensor to determine when/if the trailing edge of the top sheet of media passes underneath the bend sensor. Once the pick wheel has been activated to feed the top sheet 515 of media into the pair of pinch rollers 554, the controller can detect when the resistance of the bond sensor decreases when the trailing edge of the top sheet 515 of media goes past the first bend sensor. When the resistance of the first bend sensor 506A has not decrease after a threshold amount of time, the controller may indicate that the media has jammed or that a miss pick has occurred.

The second bend sensor 506B extends into the output media tray 505. The tip of the second bend sensor is deflected by different amounts depending on the amount of media 514 loaded into the output media tray 505. The controller 560 is coupled to the second bend sensor and can determine the resistance of the bend sensor. The controller 560 may contain memory that has a calibration table that correlates the resistance of the bend sensor to the number of media sheets in the stack of media 514. The controller 560 can determine the amount of media in the stack using the resistance of the bend sensor and the calibration table.

The controller may also use the bend sensor to determine when/if the leading edge of the sheet of media enters the output media tray 505. As the pair of output rollers 562 move media 566 towards the output media tray 505, the controller can detect when the resistance of the bend sensor increase when the leading edge of the media 566 goes past the second bend sensor 506B. When the resistance of the bend sensor has not increased after a threshold amount of time, the controller may indicate that the media has jammed.

What is claimed is:

1. A printer, comprising:
   at least one media tray to support a stack of media sheets; and
   a first bend sensor having a base attached to the printer, the first bend sensor having a tip opposite the base to extend into the at least one media tray to be deflected by media positioned in the at least one media tray.

2. The printer of claim 1, further comprising:
   a support surface forming a plane in the media tray to support the stack of media; and
   wherein the first bend sensor makes an angle in a range of 0 to 90 degrees with respect to the plane of the support surface when the media tray is empty.

3. The printer of claim 1, where the first bend sensor is partially deflected when the media tray is empty.

4. The printer of claim 1, wherein the tip is in a first position when the at least one media tray is empty and the tip is in a second position when the at least one media tray is full such that the distance between the tip in the first position and the lip in the second position is between 30 millimeters (mm) and 110 mm.

5. The printer of claim 1, where the at least one media tray is removed from the printer to load media into the at least one media tray.

6. The printer of claim 1, where the at least one media tray is an output media tray.

7. The printer of claim 1, further comprising:
   a support surface forming a plane in the at least one media tray to support the stack of media;
   a recess in the support surface where the recess is below the plane of the support surface; and
   the tip extending into the recess such that the tip is not deflected when the at least one media tray is empty.

8. The printer of claim 1, further comprising:
   a second media tray; and
   a second bend sensor having a base attached to the printer, the second bend sensor extending into the second media tray to enable media positioned in the second media tray to deflect the lip of the second bend sensor.

9. The printer of claim 1, further comprising:
   a controller, the controller to determine the resistance of the bend sensor; and
   the controller to determine a number of media sheets in the at least one media tray based on the resistance of the bend sensor.

10. The printer of claim 9, further comprising:
    a pick mechanism adjacent to the at least one media tray to pick a top sheet of media from the media tray and feed the top sheet into a paper path in the printer; and
    the controller to determine when a trailing edge of the top sheet passes the bend sensor.

11. A printer, comprising:
    at least one media tray to support a stack of media sheets; and
    a first bend sensor having a base attached to the printer, the first bend sensor having a tip opposite the base to extend into the at least one media tray and a deflection amount of the tip to indicate a media parameter.

12. The printer of claim 11, wherein the media parameter includes at least one of a media width, a media length and a number of media sheets.

13. The printer of claim 11, further comprising:
    a second bend sensor having a tip, a deflection amount of the tip to indicate a media parameter; and
    wherein the media parameter indicated by the first bend sensor is a number of media sheets in the at least one media tray and the media parameter indicated by the second bend sensor is a width of the media in the media tray.

14. A printer, comprising:
    at least one media tray to hold a stack of media;
    at least one media guide in the at least one media tray, the at least one media guide movable between a first position corresponding to media of a first width and a second position corresponding to media of a second width; and
    a bend sensor coupled to the at least media guide, the bend sensor deflected by a first amount when the media guide is in the first position and a second amount different from the first amount when the media guide is in the second position.

15. The printer of claim 14, wherein the coupling between the bend sensor and the at least one media guide is a reduction coupling such that a movement of the at least one media guide will cause a smaller proportional deflection of the bend sensor.

* * * * *

UNITED STATES PATENT AND TRADEMARK OFFICE
CERTIFICATE OF CORRECTION

PATENT NO. : 10,464,348 B2
APPLICATION NO. : 15/523356
DATED : November 5, 2019
INVENTOR(S) : Arthur H. Barnes et al.

Page 1 of 1

It is certified that error appears in the above-identified patent and that said Letters Patent is hereby corrected as shown below:

In the Claims

In Column 5, Line 37, in Claim 4, delete "lip" and insert -- tip --, therefor.

In Column 6, Line 4, in Claim 8, delete "lip" and insert -- tip --, therefor.

In Column 6, Line 42, in Claim 14, delete "at least media" and insert -- at least one media --, therefor.

In Column 6, Line 45, in Claim 14, delete "from" and insert -- than --, therefor.

Signed and Sealed this
Twenty-fourth Day of March, 2020

Andrei Iancu
*Director of the United States Patent and Trademark Office*